(12) United States Patent
Simpson et al.

(10) Patent No.: US 7,162,832 B2
(45) Date of Patent: Jan. 16, 2007

(54) RODENT SNAP TRAP DEVICE

(75) Inventors: Arthur W. Simpson, Honululu, HI (US); Richard V. Price, Pukalaul, HI (US)

(73) Assignee: Integrated Pest Management Technologies, Inc., Honolulu, HI (US)

( * ) Notice: Subject to any disclaimer, the term of this patent is extended or adjusted under 35 U.S.C. 154(b) by 0 days.

(21) Appl. No.: 10/824,802

(22) Filed: Apr. 15, 2004

(65) Prior Publication Data

US 2004/0244273 A1    Dec. 9, 2004

Related U.S. Application Data

(60) Provisional application No. 60/463,446, filed on Apr. 15, 2003.

(51) Int. Cl.
*A01M 23/30*    (2006.01)

(52) U.S. Cl. .............................. 43/81; 43/92

(58) Field of Classification Search .................... 43/81, 43/82, 83, 83.5, 92, 93
See application file for complete search history.

(56) References Cited

U.S. PATENT DOCUMENTS

| | | | | |
|---|---|---|---|---|
| 580,694 A * | 4/1897 | Hooker et al. ................. | 43/82 |
| 611,749 A * | 10/1898 | Davis ............................ | 43/82 |
| 883,772 A * | 4/1908 | Armstrong ..................... | 43/93 |
| 1,248,944 A * | 12/1917 | Stilson ........................ | 43/83.5 |
| 1,796,503 A * | 3/1931 | Bunker .......................... | 43/82 |
| 1,956,358 A | 4/1934 | McCreary | |
| 2,426,973 A * | 9/1947 | McCrimmon .................. | 43/81 |
| 2,495,454 A * | 1/1950 | Hrabal ........................ | 43/83.5 |
| 2,616,211 A * | 11/1952 | Johnson ........................ | 43/81 |
| 2,640,293 A * | 6/1953 | Cook ............................ | 43/81 |
| 5,488,800 A * | 2/1996 | O'Hara ......................... | 43/81 |

* cited by examiner

*Primary Examiner*—Teri Pham Luu
*Assistant Examiner*—Susan C. Alimenti
(74) *Attorney, Agent, or Firm*—Myers Dawes Andras and Sherman LLP; Vic Y. Lin

(57) ABSTRACT

A rodent snap trap device includes a snap bar rotatably coupled to a base. The snap bar is rotatable between a spring biased, rest position and a loaded position. A unitary trigger is pivotably coupled to the base. The trigger includes a horizontal trigger portion with a rectangular platform and a vertical trigger portion with a catch. Disposed on an external side of the vertical trigger portion, the catch is located outside of a snap zone defined by a perimeter of the snap bar in the rest position such that setting up the trap does not require a user to expose his hand to the pathway of the snap bar. Adhesive material and/or rodent attractants may be disposed on a top surface of the rectangular platform. A removable cover is disposed over the platform, covering the adhesive material and/or rodent attractants.

16 Claims, 2 Drawing Sheets

US 7,162,832 B2

RODENT SNAP TRAP DEVICE

RELATED APPLICATION

The present application is related to U.S. Provisional Patent Application Ser. No. 60/463,446, filed on Apr. 15, 2003, which is incorporated herein by reference and to which priority is claimed pursuant to 35 USC § 119.

BACKGROUND OF THE INVENTION

1. Field of the Invention

The invention relates generally to pest control and, more particularly, to rat traps.

2. Description of Prior Art and Related Information

Conventional rat traps according to the prior art include a snap bar rotatably coupled to a base. The snap bar is biased to a default position by a spring located centrally on the base. In this default position, the snap bar defines the perimeter of a "danger zone," or snap zone, where any rodent or human finger, as the case may be, may be injured upon the snapping action of the snap bar. One such rat trap is the VICTOR® product provided by Woodstream Corp. The trigger mechanism in such a trap consists of two separate components: a rod and a catch. The catch is disposed within the danger zone. To set the trap, the snap bar is rotated against the bias of the spring to a nearly horizontal position adjacent to a first end of the base. A first end of the rod is tied down to the first end of the base. The rod is maneuvered over the top of the rotated snap bar. The opposite, free end of the rod is then manually engaged with the catch disposed within the danger zone.

The major drawback with conventional rat traps according to the prior art involves setting up the trap. Since the catch is located within the operative area covered by the snap bar, setting the above-described rat trap presents the risk of the user's fingers being caught if a slight slip occurs. In particular, a user is required to hold back the spring biased snap bar, extend the rod over the top of the held back snap bar, and engage the free end of the rod with a catch that lies within the danger zone, all at the same time. Should the user accidentally release or lose hold of the base or snap bar prior to the rod being engaged with the catch, or should the rod slip off the catch prematurely, the snap bar will of course instantly snap and injure any fingers located within the danger zone which were attempting to set the rod to the catch.

Another major drawback of the conventional rap traps is that the trigger mechanism comprises two separate components, a rod and a catch, each of which is coupled to the base at a separate point of contact.

SUMMARY OF THE INVENTION

In accordance with the present invention, improved and simplified structures are disclosed which overcome the deficiencies of the prior art.

In one aspect, a rodent terminating device comprises a base, a snap bar and a unitary trigger. The base has a first end and a second end. A snap bar is pivotably coupled to the base. The snap bar is configured to rotate between a first default position adjacent to the first end of the base and a second loaded position adjacent to the second end of the base. The snap bar is spring biased toward the first position. The snap bar has at least one axial section and one transverse section. The trigger is configured to releasably engage the snap bar in the second loaded position. The trigger includes a horizontal trigger portion and a vertical trigger portion. The vertical trigger portion comprises a catch adapted to engage the transverse section of the snap bar.

The vertical trigger portion has a fixed angle between 70 to 110 degrees with respect to the horizontal trigger portion, and may be considered substantially perpendicular thereto. The trigger is configured to pivot near a point wherein the vertical trigger portion and horizontal trigger portion meet. In particular, the trigger is configured to pivot between an engaged position, where the catch is engaged with the snap bar in the second loaded position, and a disengaged position where the catch is disengaged from the snap bar.

The horizontal trigger portion is suspended above the base when the trigger is in the engaged position. The device further comprises an anchor, such as a staple, pivotably coupling the trigger to the base. The staple facilitates and provides the pivot between the horizontal trigger portion and the vertical trigger portion. The horizontal trigger portion comprises a platform. An adhesive material may be disposed on the platform. One or more rodent attractants may also be disposed on the platform or on the base adjacent to the platform.

The device further comprises a releasable liner disposed over the adhesive material on the platform. The horizontal trigger portion comprises a stem extending between the platform and the vertical trigger portion. The stem includes a bend such that the platform is disposed further upwardly away from the base.

The vertical trigger portion comprises a first side facing the first end of the base and a second side facing the second end of the base. The catch is disposed on the second side of the vertical trigger portion.

In another aspect, a rodent terminating device comprises a base having a first base end and a second base end, and a snap bar rotatable between a first rest position adjacent to the first base end and a second loaded, or cocked, position adjacent to the second base end. The snap bar is spring biased toward the first rest position. A trigger is pivotably coupled to the base. The trigger comprises a substantially horizontal platform and a catch configured to releasably engage the snap bar in the second loaded position. The horizontal platform is suspended above the base when the catch is engaged with the snap bar in the second loaded position.

The horizontal platform is included in a horizontal trigger portion. The catch is included in a vertical trigger portion. The vertical trigger portion is substantially perpendicular to the horizontal trigger. The trigger comprises a bend between the vertical trigger portion and the horizontal trigger portion. The device further comprises a anchor pivotably coupling the trigger to the base at the bend.

The device further comprises an adhesive material disposed on top of the horizontal platform. The device may also comprise one or more rodent attractants disposed on top of the horizontal platform. The device further comprises a removable cover disposed over the horizontal platform.

In a further aspect, a rodent terminating device is provided, comprising a one-piece, or unitary, trigger. The device includes a base having a first end and a second end. A snap bar is rotatably coupled to the base. The snap bar is rotatable between a spring biased, rest position and a loaded position. The snap bar defines a snap zone when disposed in the rest position. The one-piece trigger has a horizontal platform disposed in the snap zone and a catch disposed outside of the snap zone. The catch is included in a vertical portion of the trigger while the horizontal platform is included in a horizontal portion of the trigger. The trigger is pivotable between an engaged position where the catch engages the snap bar in the loaded position, and a disengaged position where the catch is disengaged from the snap bar.

In summary, a rodent snap trap device includes a snap bar rotatably coupled to a base. The snap bar is rotatable between a spring biased, rest position and a loaded position. A unitary trigger is pivotably coupled to the base. The trigger includes a horizontal trigger portion with a rectangular platform and a vertical trigger portion with a catch. Disposed on an external side of the vertical trigger portion, the catch is located outside of a snap zone defined by a perimeter of the snap bar in the rest position such that setting up the trap does not require a user to expose either hand to the pathway of the snap bar. Adhesive material and/or rodent attractants may be disposed on a top surface of the rectangular platform. A removable cover is disposed over the platform, covering the adhesive material and/or rodent attractants.

The invention, now having been briefly summarized, may be better visualized by turning to the following drawings wherein like elements are referenced by like numerals.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE
PREFERRED EMBODIMENTS AND BEST
MODE OF INVENTION

Figure 1:
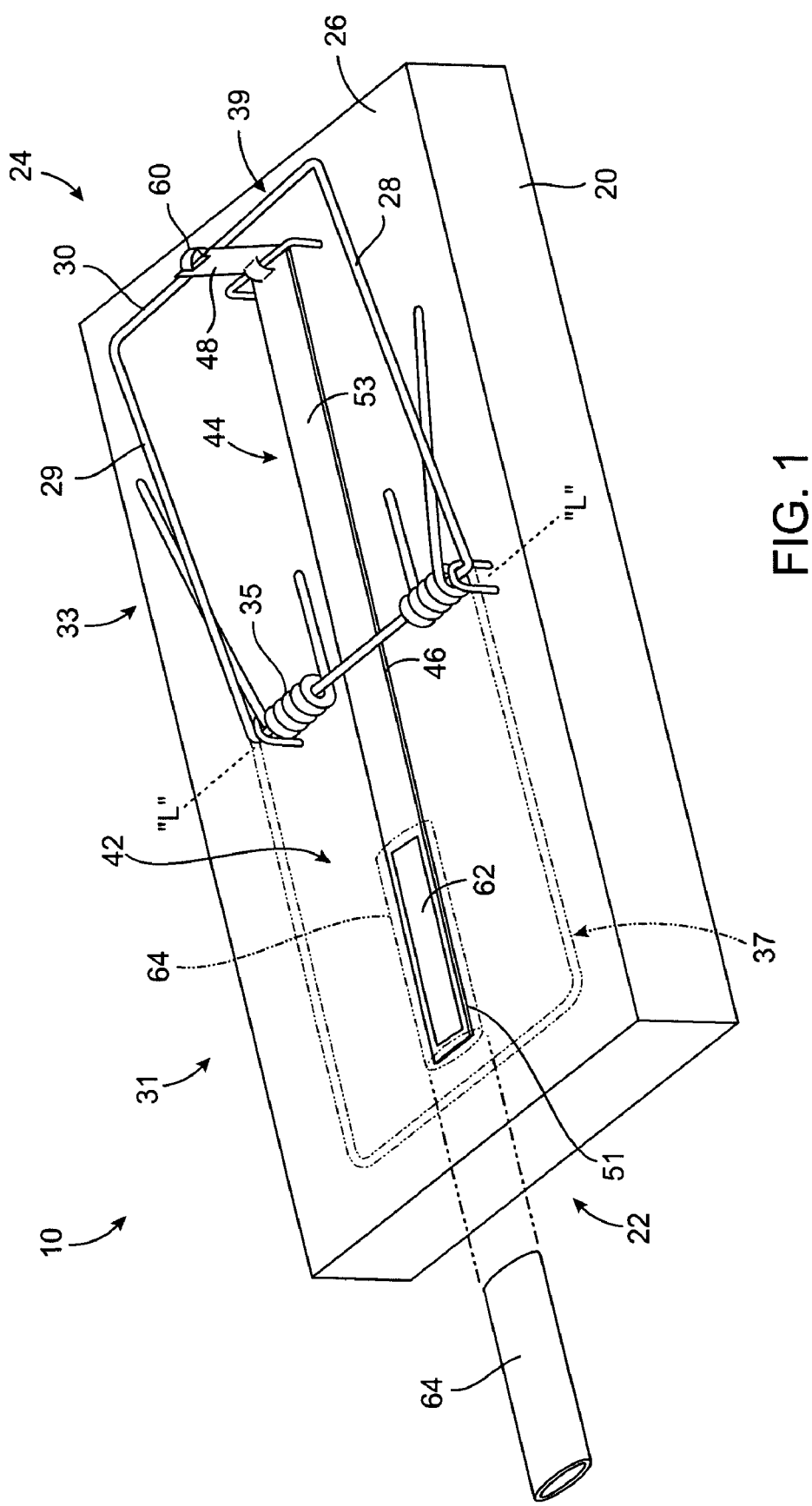
FIG. 1 is a perspective view of a preferred embodiment of a rodent trap device according to the invention.

FIG. 1 is a perspective view of a preferred embodiment of a rodent snap trap, or device, 10. The device 10 comprises a base 20 having a first end 22, a second end 24 and a top surface 26. A snap bar 28 is rotatably coupled, or anchored, to a central portion of the top surface 26 of the base 20, thereby dividing the top surface 26 into a first operative half 31 and a second, loading, or non-operative, half 33. The points of pivot of the snap bar 28 to which the bar 28 is coupled to the base 20 define a transverse dividing line "L" that divides the base 20 into the operative half 31 and non-operative half 33. The snap bar 28 comprises a pair of axial sections 29 joined by a transverse section 30. Springs 35 bias the snap bar 28 to a rest, or unloaded, position 37 as indicated by phantom lines in FIG. 1. The snap bar 28 is thus rotatable between a first rest position 37 and a second loaded position 39 as described further below.

In the first rest position 37 shown in FIG. 1, the snap bar 28 lies in the first operative half 31 of the base 20 and defines a perimeter of a danger zone, or snap zone, 42 of the top surface 26 where any portion of a rodent located therein will get caught by the snap bar 28 upon snapping.

In the preferred embodiment, the device 10 comprises a rigid, one-piece trigger mechanism, or simply trigger, 44 that is pivotably, or rotatably, coupled to the base 20 in the non-operative half 33. The unitary trigger 44 comprises a horizontal trigger portion 46 and a vertical trigger portion 48. The horizontal trigger portion 46 includes a platform 51 at a far or distal end, and a stem 53 that extends between the platform 51 and the vertical trigger portion 48. The vertical trigger portion 48 extends substantially perpendicularly to the horizontal trigger portion 46. Since the trigger 48 comprises a unitary piece, the vertical trigger portion 48 is integral with the horizontal trigger portion 46. The two trigger portions 46, 48 are integrally connected by a perpendicular bend 50 shown more clearly in FIGS. 3 and 4. Furthermore, since the trigger 48 is composed of a rigid material, the angle between the horizontal trigger portion 46 and the vertical trigger portion 48 is substantially fixed. It should be expressly understood that the angle between the horizontal trigger portion 46 and the vertical trigger portion 48 may preferably be in the range between 70° and 110° and still be considered substantially perpendicular.

Figure 2:
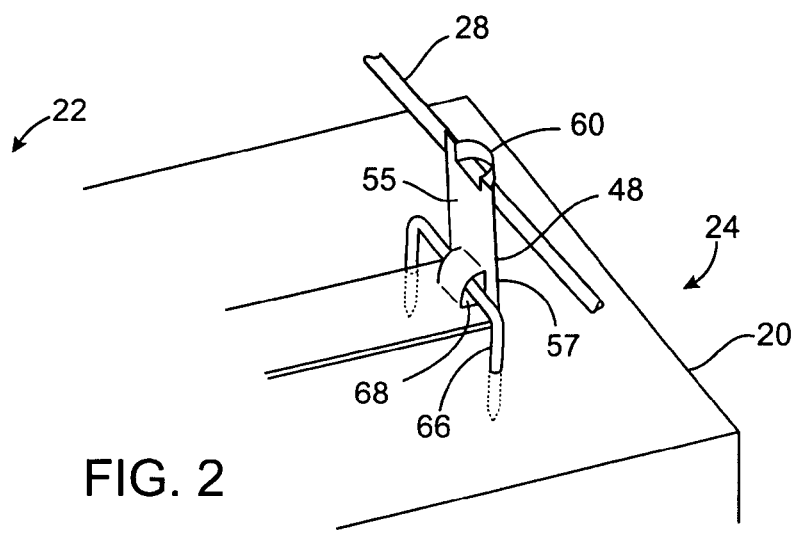
FIG. 2 is a close-up perspective view of the preferred embodiment of the rodent trap device.

As shown in FIG. 2, the vertical trigger portion 48 comprises a first, inner side 55 that faces the first end 22 of the base 20 and a second, outer side 57 that faces the second end 24 of the base 20. The vertical trigger portion 48 comprises a catch 60 disposed on the outer side 57 near a top of the vertical trigger portion 48. Alternatively stated, the catch 60 located adjacent to the top of the vertical trigger portion 48 projects outwardly toward the second end 24 of the base 20 so as to engage the snap bar 28 on the outer side 57 of the vertical trigger portion 48.

In FIG. 1, the platform 51 comprises a surface area large enough to carry a sufficient amount of adhesive material 62 thereon. In particular, the surface area is large enough and the adhesive material sufficient enough to prevent a rodent adhered to the horizontal sticky platform 51 from separating itself without setting off the trigger 44. It will be appreciated that the area of the platform 51 is short enough to fit within the snap zone 42 defined by the snap bar 28. Rodent attractants, such as food, flowers, sex attractant odors, glow-in-the-dark material, glitter and others, may also be disposed on top of the platform 51.

As a further embodiment, the top surface of the platform 51 may comprise a mirror or other light reflecting components to further attract rodents. A removable cover 64 is disposed over the adhesive material 62 and may be removed when the device 10 is in use. Furthermore, the platform 51 may be provided as an enlarged square to hold more adhesive material and attractants, while still being small enough to fit in the snap zone 42 defined by the snap bar 28 in the rest position 37.

Figure 3:
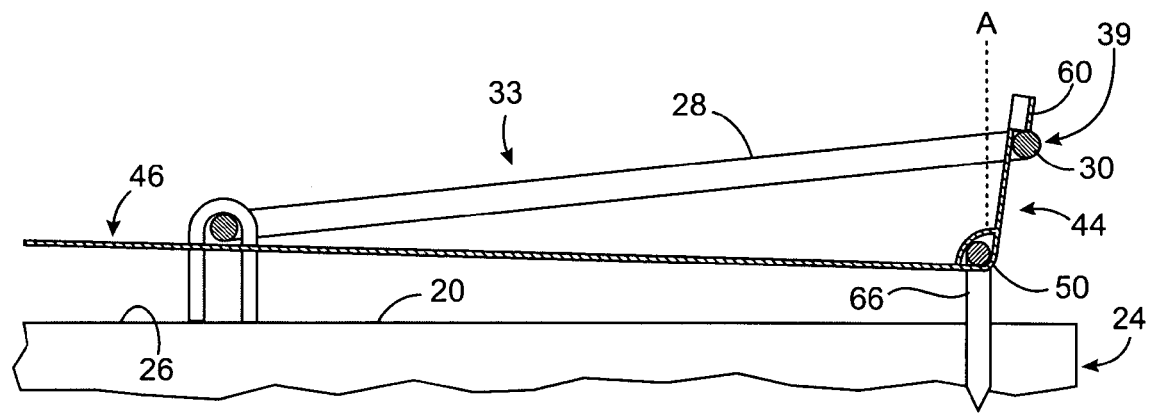
FIG. 3 is a side view of the preferred embodiment of the rodent trap device showing a snap bar in a loaded position.
Figure 4:
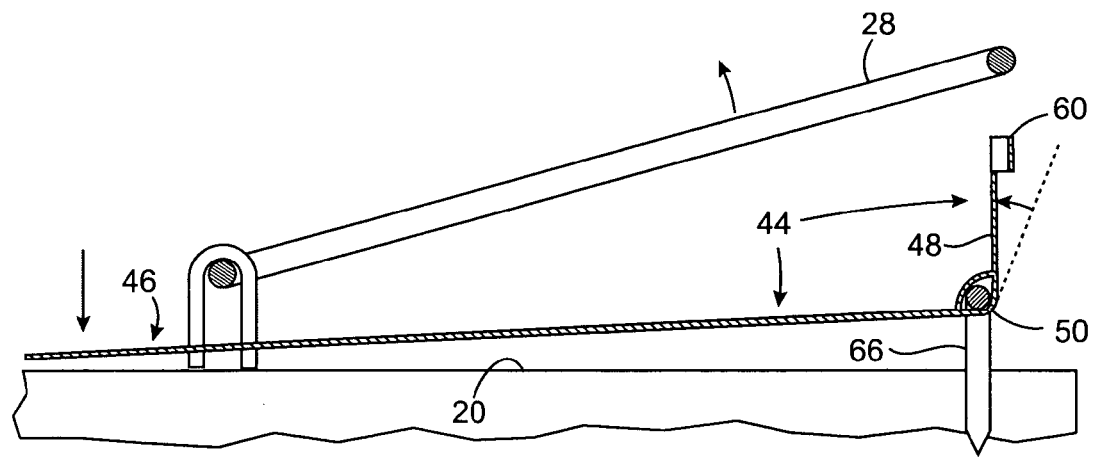
FIG. 4 is a side view of the preferred embodiment of the rodent trap device showing a snap bar after being disengaged with a catch of a trigger.

To set the trap 10, the snap bar 28 is rotated against the bias of the springs 35, or cocked, toward the second end 24 of the base 20. In FIG. 3, the transverse section 30 of the snap bar 28 is rotated beneath the catch 60. The trigger 44 is then slightly rotated toward the transverse section 30, which is shown as a clockwise direction in FIG. 3, such that the transverse section 30 of the snap bar 28 is engaged with the catch 60. In the preferred embodiment shown in FIG. 3, the catch 60 is disposed above the transverse section 30 of the snap bar 28 when engaged. The transverse section 30 may include a recessed flat portion adapted to abut the catch 60. When the snap bar 28 is set up in the loaded position 39 as shown in FIG. 3, it will be appreciated that the vertical trigger portion 48 is slightly tilted toward the second end 24 of the base 20 such that the horizontal trigger portion 46 is suspended above the top surface 26 of the base 20. In the illustrated embodiment in FIG. 3, a vertical axis A extends perpendicularly with respect to the top surface 26 of the base 20. Thus, when the catch 60 is engaged with the snap bar 28 in the loaded position, the vertical trigger portion 48 is tilted clockwise from the vertical axis A, thereby causing the horizontal trigger portion 46 to be suspended above the top surface 26 of the base 20.

Unlike a conventional rap trap where the catch is disposed in the danger zone of the snap bar, the catch 60 according to the present invention is disposed in the non-operative half 33 of the base 20, far away from the danger zone 42 of the operative half 31 shown in FIG. 1. Accordingly, it will be appreciated that in setting up the trap 10, the user is not required to place any fingers in the danger zone 42. The device 10 according to the invention eliminates the risk of exposing the user's hands or fingers to the downward pathway of the snap bar 28 when setting up the trap 10.

In operation, when a rodent contacts the horizontal trigger portion 46, particularly, the sticky platform 51 shown in FIG. 1, and applies a downward force thereto, the vertical trigger portion 48 pivots away from the second end 24 towards the first end 22 of the base 20 (shown in FIG. 4 as a counterclockwise direction), thereby disengaging the catch 60 from the snap bar 28. Alternatively stated, the trigger 44 pivots from an engaged position where the catch 60 is engaged with the snap bar 28, to a disengaged position where the catch 60 is disengaged from the snap bar 28. The snap bar 28 is thus disengaged from the catch 60 and will be spring biased to snap to the rest position 37, shown in FIG. 1.

It is to be expressly understood that the pivoting action of the trigger 44 may be accomplished in a plurality of ways. As an example and not by way of limitation, the preferred embodiment includes an anchor 66 that extends transversely through an aperture 68 defined adjacent to the bend 50 as shown in FIG. 2. In the illustrated embodiment, the anchor 66 comprises a staple 66 that pivotably couples the trigger 44 to the base 20. In particular, the area where the trigger 44 is coupled to the base 20, which is shown in the preferred embodiment as the bend 50, becomes a pivot point about which the trigger 44 rotates. Thus, the one-piece trigger 44 is pivotably coupled to the base 20 at a single point of contact which is located in the non-operative half 33 of the base 20. As shown in FIG. 1, the single point of contact of the trigger 44 at the base 20 anchors the tension required to keep both the horizontal portion 46 of the trigger 44 in suspension and the snap bar 28 under spring tension in the cocked position 39. The spring tension of the snap bar 28 in the cocked position 39, opposed to the anchor of the single point of contact directly provides the tension required to hold the trigger 44 in the cocked position 39. Accordingly, movement of the trigger 44 is the singular cause for release of tension between the snap bar 28 and the single point of contact.

In an alternative embodiment, the horizontal stem 53 may include an upward bend as it extends toward the platform 51. This enables the trigger 44 a greater range of pivot.

It will be appreciated that the preferred embodiment of the device 10 according to the invention provides several advantages over prior art traps. Whereas the trigger mechanism of prior art traps comprised two separates pieces, namely, a rod and a separate trigger located in the danger zone, the trigger mechanism 44 according to the invention comprises a unitary piece. With the prior art trap, the trigger mechanism would require two connections with the base: one for the rod, and a separate connection for the catch. The preferred embodiment according the invention requires only one point of contact where the trigger 44 is coupled to the base 20. Such reduction in complexity leads to greater ease of manufacturing, lower production costs, and greater convenience in use.

Furthermore, the snap bar 28 is cocked and held in the loaded position by a one-piece trigger 44 where the catch 60 is located in the non-operative half 33 of the base 20. Unlike prior art traps which require the user to delicately engage a rod with a catch that is located in the danger zone, the catch 60 according to the invention is located outside of the danger zone 42, thereby eliminating the risk of either of the user's hands being caught by the snap bar 28 due to an accidental release or slip. Furthermore, since the trigger 44 according to the invention preferably comprises a single, unitary piece, the user is not required to hold a catch with one hand while manipulating a separate rod with the other hand.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what incorporates the essential idea of the invention.

What is claimed is:

1. A rodent terminating device, comprising:
   a base having a first end, a second end, a first side, a second side, a length and a top base surface;
   a snap bar pivotably coupled to the base, the snap bar being configured to rotate between a first default position adjacent to the first end of the base and a second loaded position adjacent to the second end of the base, the snap bar being biased by at least one spring toward the first position, the snap bar having at least one axial section and one transverse section, the at least one spring defining a longitudinal axis, the at least one spring being positioned adjacent to the first side or the second side of the base so as to leave a central gap;

a trigger configured to engage the snap bar in the second loaded position, the trigger including a straight horizontal trigger portion and an integral vertical trigger portion extending upwardly from and substantially perpendicularly to the horizontal trigger portion, the vertical trigger portion comprising a catch disposed adjacent to the second end of the base and adapted to directly and releasably engage the transverse section of the snap bar, the straight horizontal trigger portion extending substantially along the length of the base through the central gap and beneath the longitudinal axis of the at least one spring, the trigger comprising a bend between the vertical trigger portion and the horizontal trigger portion, the trigger defining a hole adjacent to the bend; and an anchor extending through the bend and pivotably coupling the trigger to the base at the bend, wherein the trigger comprises a pivot point above the top base surface, and wherein the trigger is configured to pivot above the top base surface between an engaged position, where the catch is engaged with the snap bar in the second loaded position, and a disengaged position where the catch is disengaged from the snap bar.

2. The device of claim 1, wherein the vertical trigger portion has an angle between 70 to 110 degrees with respect to the horizontal trigger portion.

3. The device of claim 1, wherein the horizontal trigger portion comprises a platform.

4. The device of claim 3, further comprising an adhesive material disposed on the platform.

5. The device of claim 4, further comprising a rodent attractant disposed on top of the platform.

6. The device of claim 4, further comprising a removable cover disposed over the adhesive material on the platform.

7. The device of claim 3, wherein the horizontal trigger portion comprises a stem extending between the platform and the vertical trigger portion.

8. The device of claim 1, wherein:
the vertical trigger portion comprises a first side facing the first end of the base and a second side facing the second end of the base; and
the catch is disposed on the second side of the vertical trigger portion.

9. A rodent terminating device, comprising:
a base having a first base end, a second base end, a first side, a second side, a length and a top base surface;
a snap bar rotatable between a first rest position adjacent to the first base end and a second loaded position adjacent to the second base end, the snap bar being rotatably coupled to the base and biased toward the first rest position by at least one spring, the at least one spring defining a longitudinal axis, the at least one spring being positioned adjacent to the first side or the second side of the base so as to leave a central gap;
a trigger pivotably coupled to the base, the trigger comprising a straight horizontal trigger portion having a horizontal platform and an integral vertical trigger portion substantially perpendicular to, and depending upwardly from, the horizontal trigger portion, the vertical trigger portion comprising a catch disposed adjacent to the second end of the base and configured to directly and releasably engage the snap bar in the second loaded position, the trigger comprising a pivot point above the top base surface and a bend between the vertical trigger portion and the horizontal trigger portion the trigger defining a hole adjacent to the bend; and an anchor extending through the bend and pivotably coupling the trigger to the base at the bend, wherein the horizontal platform is suspended above the base when the catch is engaged with the snap bar in the second loaded position and wherein the straight horizontal trigger portion extends substantially along the length of the base through the central gap and beneath the longitudinal axis of the spring.

10. The device of claim 9, further comprising an adhesive material disposed on top of the horizontal platform.

11. The device of claim 10, further comprising a rodent attractant disposed on top of the horizontal platform.

12. The device of claim 10, further comprising a removable cover disposed over the horizontal platform.

13. A rodent terminating device, comprising:
a base having a first end, a second end, a first side, a second side, a length and a top base surface;
a snap bar rotatably coupled to the base, the snap bar being rotatable between a rest position and a loaded position, the snap bar defining a snap zone when disposed in the rest position and defining a pivot line, the snap bar being biased to the rest position by at least one spring defining a longitudinal axis, the at least one spring being disposed adjacent to the first side or the second side of the base so as to leave a central gap;
a one-piece trigger having a straight horizontal trigger portion and an integral vertical trigger portion extending upwardly from and substantially perpendicularly to the horizontal trigger portion, the horizontal trigger portion including a horizontal platform disposed in the snap zone, the straight horizontal portion extending substantially along the length of the base through the central gap and beneath the longitudinal axis of the spring, the vertical trigger portion including a catch disposed outside of the snap zone and adjacent to the second end of the base so as to directly and releasably engage the snap bar in the loaded position, the trigger comprising a bend between the vertical trigger portion and the horizontal trigger portion, the trigger defining a hole adjacent to the bend; and an anchor extending through the bend and pivotably coupling the trigger to the base at the bend, wherein the trigger comprises a pivot point above the top base surface, and wherein movement of the straight horizontal trigger portion at the first end of the base directly and immediately causes movement of the catch releasably engaged with the snap bar in the loaded position.

14. The device of claim 13, wherein the trigger is pivotable between an engaged position where the catch engages the snap bar in the loaded position, and a disengaged position where the catch is disengaged from the snap bar.

15. A rodent terminating device, comprising:
a base having a first end, a second end, a first side, a second side, a length and a top surface;
a snap bar rotatably coupled to the base along a pivot dividing line which divides the top surface of the base into a first operative half and a second non-operative half, the snap bar being biased to rotate toward the first operative half by at least one spring defining a longitudinal axis, the at least one spring being disposed adjacent to the first side or the second side of the base to as to leave a central gap;

a one-piece trigger pivotably coupled to the base at a single point of contact above the top surface of the base, the one-piece trigger comprising a straight horizontal trigger portion and an integral vertical trigger portion that extends upwardly from and substantially perpendicularly to the horizontal trigger portion, the horizontal trigger portion comprising an integral platform at a distal end opposite to the vertical trigger portion, the straight horizontal trigger portion extending substantially along the length of the base through the central gap and beneath the longitudinal axis of the at least one spring, the vertical trigger portion comprising a catch disposed adjacent to the second end of the base and configured to directly engage the snap bar at a position above the base, the trigger comprising a bend between the vertical trigger portion and the horizontal trigger portion, the trigger defining a hole adjacent to the bend, and an anchor extending through the bend and pivotably coupling the trigger to the base at the bend.

16. The device of claim 15, wherein the single point of contact is located in the nonoperative half of the base.

* * * * *